US012608040B2

(12) United States Patent (10) Patent No.: US 12,608,040 B2
Lee et al. (45) Date of Patent: Apr. 21, 2026

(54) COMPUTING DISPLAYS WITH FOLDABLE PANELS

(71) Applicant: Hewlett-Packard Development Company, L.P., Spring, TX (US)

(72) Inventors: Chien-Kuo Lee, Taipei City (TW); Chang-I Chen, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 154 days.

(21) Appl. No.: 18/553,892

(22) PCT Filed: Apr. 20, 2021

(86) PCT No.: PCT/US2021/028161
    § 371 (c)(1),
    (2) Date: Oct. 4, 2023

(87) PCT Pub. No.: WO2022/225511
    PCT Pub. Date: Oct. 27, 2022

(65) Prior Publication Data
    US 2024/0370052 A1     Nov. 7, 2024

(51) Int. Cl.
    G06F 1/16          (2006.01)
(52) U.S. Cl.
    CPC .......... G06F 1/1616 (2013.01); G06F 1/1601 (2013.01); G06F 1/1641 (2013.01); G06F 1/1652 (2013.01); G06F 1/1681 (2013.01)
(58) Field of Classification Search
    CPC .... G06F 1/1616; G06F 1/1601; G06F 1/1641; G06F 1/1652; G06F 1/1681; G09F 9/301
    See application file for complete search history.

(56) References Cited

U.S. PATENT DOCUMENTS

| | | | | |
|---|---|---|---|---|
| 8,083,189 B2 * | 12/2011 | Sun | ......................... | F16M 11/08 |
| | | | | 361/679.04 |
| 8,539,705 B2 * | 9/2013 | Bullister | ............... | G06F 1/1615 |
| | | | | 361/679.04 |
| 9,119,316 B2 * | 8/2015 | Lee | ...................... | H04M 1/0268 |
| 9,307,658 B2 * | 4/2016 | Song | ...................... | F16M 11/00 |
| 10,852,764 B2 * | 12/2020 | Senatori | .................... | G06F 1/16 |
| 10,909,889 B2 * | 2/2021 | Lee | .......................... | G09F 9/301 |
| 11,500,421 B2 * | 11/2022 | Perelli | .................. | G06F 1/1696 |
| 11,758,671 B2 * | 9/2023 | Kim | .................. | G02F 1/133305 |
| | | | | 361/807 |
| 11,953,943 B2 * | 4/2024 | Leite Gomes | ........ | G06F 1/1681 |
| 11,983,041 B2 * | 5/2024 | Cheng | ................... | G06F 1/1637 |
| 12,032,407 B2 * | 7/2024 | Dias Duarte | ......... | G06F 1/1641 |

(Continued)

FOREIGN PATENT DOCUMENTS

| | | |
|---|---|---|
| CN | 103582340 A | 2/2014 |
| KR | 10-2018-0030433 A | 3/2018 |

*Primary Examiner* — Rockshana D Chowdhury
(74) *Attorney, Agent, or Firm* — Quarles & Brady LLP

(57) ABSTRACT

The present disclosure describes a method of folding a computing display. An example method includes receiving a first force on a first side of a housing of a computing display. The method further includes applying a second force on a second side of the housing, responsive to receiving the first force on the first side of the housing. The method also includes causing the first side of the housing and the second side of the housing to fold over a center panel of the housing of the computing display, responsive to application of the first force and the second force.

17 Claims, 9 Drawing Sheets

(56)         References Cited

U.S. PATENT DOCUMENTS

| | | | |
|---|---|---|---|
| 12,150,261 B2 * | 11/2024 | Liu | H05K 5/0226 |
| 12,164,333 B2 * | 12/2024 | Wang | G06F 1/1641 |
| 12,265,430 B2 * | 4/2025 | Im | G06F 1/1616 |
| 12,298,819 B2 * | 5/2025 | Rhee | H04M 1/0216 |
| 2010/0201604 A1 * | 8/2010 | Kee | G06F 1/1641 |
| | | | 345/1.3 |
| 2011/0155868 A1 * | 6/2011 | Sun | F16M 11/08 |
| | | | 248/125.7 |
| 2017/0075388 A1 * | 3/2017 | Yee | G06F 1/1643 |
| 2018/0088634 A1 * | 3/2018 | Bitz | G06F 1/166 |
| 2018/0341288 A1 * | 11/2018 | Senatori | G06F 1/1618 |
| 2019/0200470 A1 | 6/2019 | Woo | |
| 2022/0163999 A1 * | 5/2022 | Perelli | G06F 1/1641 |
| 2022/0294886 A1 * | 9/2022 | Seo | G06F 1/1641 |
| 2023/0409084 A1 * | 12/2023 | Yee | G06F 1/1643 |
| 2024/0370052 A1 * | 11/2024 | Lee | G06F 1/1681 |
| 2025/0053201 A1 * | 2/2025 | Yaremenko | G06F 1/1681 |

* cited by examiner

COMPUTING DISPLAYS WITH FOLDABLE PANELS

BACKGROUND

With the flat panel display having been used for several decades, there have been many desired changes in display technology. Flexible flat panel display technology, through the development of rollable displays, have allowed for the development of a lighter, thinner product that is easier to carry and store. While computer monitors utilize a bigger desk space because of their bigger footprint, their portable alternatives keep things small, minimalist, and mobile.

The size of a notebook computer display may be a contributing factor that influences end-user satisfaction. Bigger screens are more comfortable for everyday work, multimedia, and gaming. But a bigger display means the device carrying it is heavier and bulkier. Additionally, a larger display on a notebook computer also results in an increase in power consumption relative to smaller displays. A variety of different notebook computers provide a balance of size and portability for home and office users.

DETAILED DESCRIPTION

Figure 1:
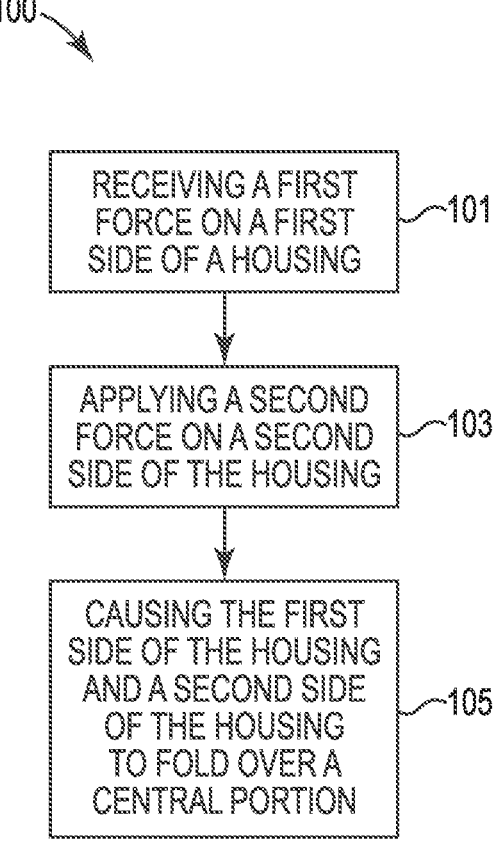
FIG. 1 illustrates an example method of folding a computing display, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

As portable computing devices increase in use, different form factors for portable computing devices have developed for different computing uses. For instance, tablet computing devices may be suitable for recreational reading and light internet use, whereas a clamshell notebook may be suitable for writing documents such as for school or work purposes. Many users desire portable computing devices that may be operable for both recreational and work/school use. However, a large display for a portable computing device often results in a larger form factor and therefore a less portable computing device. As such, it may be desirable for a portable computing device to have a flexible display that is capable of compact storage, thus providing a large display for complex computing tasks while retaining the ease of use and portability of a smaller form factor computing device.

Various examples of the present disclosure describe a method of folding a computing display. An example method includes receiving a first force on a first side of a housing of a computing display. The method further includes applying a second force on a second side of the housing, responsive to receiving the first force on the first side of the housing. The method also includes causing the first side of the housing and the second side of the housing to fold over a center panel of the housing of the computing display, responsive to application of the first force and the second force.

Examples of the present disclosure also describe a folding computing display. An example computing display includes a first hinge module disposed on a first side of the computing display. The first hinge module comprises a plurality of hinge bars extending parallel to a plane of the computing display and a plurality of resistance bands coupling the plurality of hinge bars. The computing display also includes a second hinge module disposed on a second side of the computing display. The second hinge module comprises a plurality of hinge bars extending parallel to a plane of the computing display and a plurality of resistance bands coupling the plurality of hinge bars. In various examples, the first hinge module is to fold a first side panel of the computing display over a center panel of the computing display and the second hinge module is to fold a second side panel of the computing display over the center panel.

Additional examples of the present disclosure describe an apparatus including a folding computing display. An example apparatus includes a computing display comprising a spring center shaft extending longitudinally along a plane of the computing display, and a first flexion mechanism coupled to the spring center shaft. The apparatus further includes a second flexion mechanism coupled to the spring center shaft, and a base coupled to the computing display by a hinge. In various examples, the computing display is to fold around the base in a closed position, wherein the first flexion mechanism and the second flexion mechanism are to substantially simultaneously fold the computing display toward the spring center shaft responsive to application of a force Turning now to the figures, FIG. 1 illustrates an example method 100 of folding a computing display, in accordance with the present disclosure. As illustrated, the method 100 includes receiving a first force on a first side of a housing of a computing display, at 101. The force applied on the housing of the computing display may be applied on a "back" portion of the computing display, e.g., on a side opposite of the visual display. In various examples, the force applied may be the result of a user bending and/or closing the computing display.

At 103, the method 100 includes, responsive to receiving the first force on the first side of the housing, applying a second force on a second side of the housing. In some examples, a user may manually apply a force to one side of the computing display, and manually apply a force to another side of the computing display in order to cause the display to fold in a particular manner. In some examples, the computing display may include hinge and spring mechanisms that apply the second force on the second side of the housing in response to application of a force on the first side. For instance, in response to the user applying pressure to the back of the right side of the computing display, a force may be applied to the left side of the computing display. The corresponding force may be equal in magnitude to the force applied by the user, such that the greater the force applied to the right side of the computing display, the greater the force that is applied to the left side of the computing display.

At 105, the method 100 includes, responsive to application of the first force and the second force, causing the first side of the housing and the second side of the housing to fold over a center panel of the housing of the computing display. For instance, a user may manually apply a force to the right side of the computing display to cause the right side to fold over the center panel of the computing display, and also manually apply a force to the left side of the computing display to cause the left side to fold over the center panel of the computing display. As another example, a user may apply a force to the left side of the computing display to simultaneously cause the left side and the right side of the computing display to fold over the center panel of the computing display. In such a manner, the computing display may fold both sides over the center panel responsive to application of a force on one side of the computing display. By applying a force to one side of the computing display, the amount of user-applied for to fold the device is reduced, as both sides of the computing display may fold over the center panel responsive to application of a force on one side.

In some examples, the method 100 includes causing a first spring disposed along the first side to curtail responsive to application of the first force on the first side of the housing. For instance, as discussed more thoroughly with regards to FIGS. 2A, 2B, 2C, 3A, 3B, 3C, 4A, 4B, and 4C, the computing display may include a plurality of springs that allow for coordinated and simultaneous motion of the flexible display. Responsive to application of a force on the housing of the computing display, a first spring may curtail which then induces additional movements within the computing display. In some examples, the method 100 includes causing a first spring disposed along the first side and a second spring disposed along the second side to separate from a spring center shaft responsive to application of the first force on the first side of the housing. As described herein, a spring center shaft may couple springs on opposing sides of the computing display, and allow for equal forces to be applied to the opposing sides of the computing display.

As described more thoroughly herein, the various springs included in the computing display may operate in collaboration with hinge modules to fold side panels of a computing display over a center panel. In some examples, the method 100 includes causing a first hinge module disposed along the first side to rotate responsive to application of the first force on the first side of the housing. For instance, the method 100 may include causing a second hinge module disposed along the second side to rotate responsive to application of the first force on the first side of the housing.

Figure 2A:
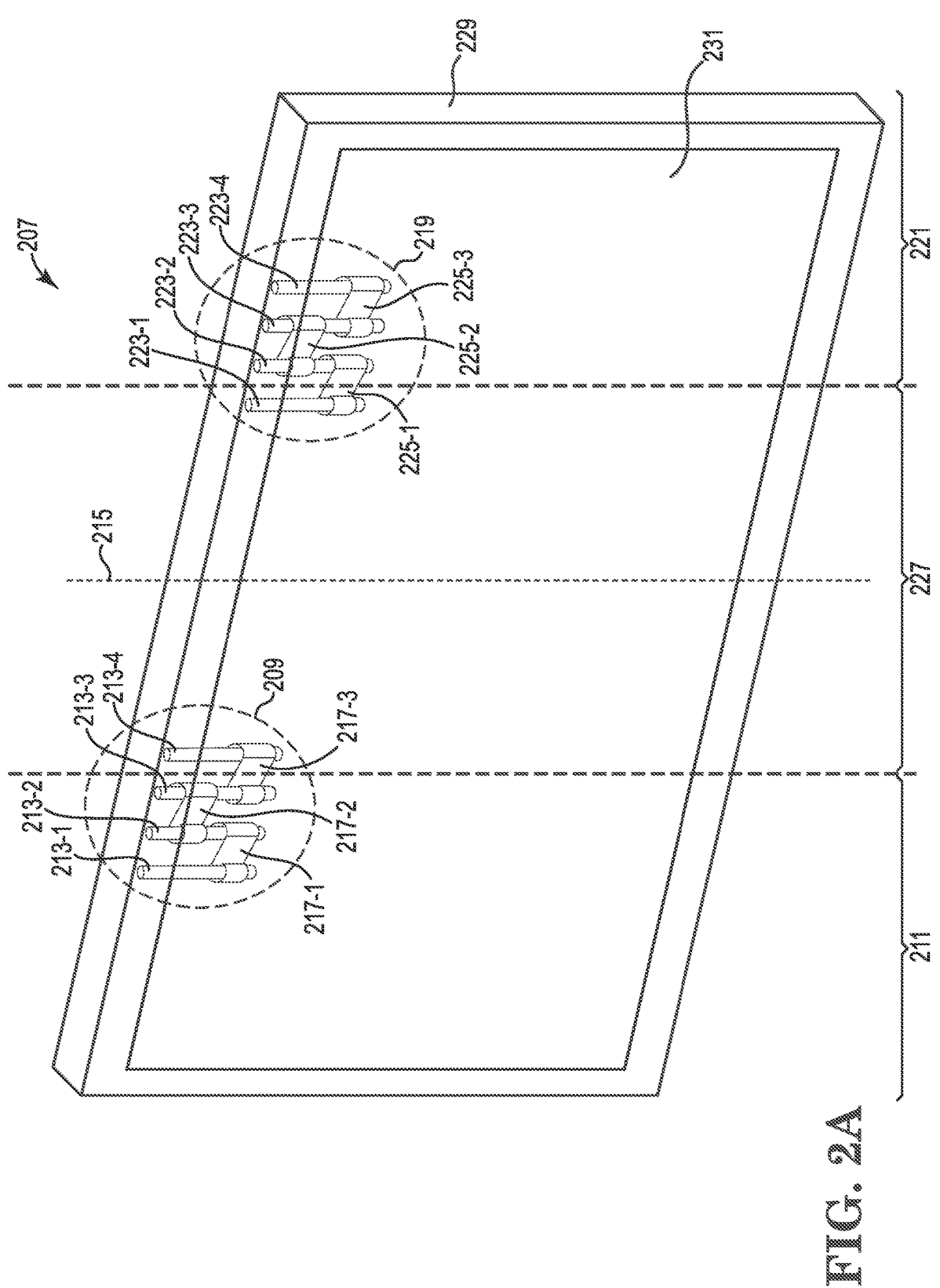
FIG. 2A illustrates an example folding computing display with hinge modules in a first position, in accordance with the present disclosure.

FIG. 2A illustrates an example folding computing display with hinge modules in a first position, in accordance with the present disclosure. As used herein, a first position refers to or includes a folding computing display in which the folding computing display is flat and in an open arrangement (such as an open clamshell computer). As illustrated in FIG. 2A, a computing display 207 in accordance with the present disclosure may include a first hinge module 209 disposed on a first side panel 211 of the computing display 207 and a second hinge module 219 disposed on a second side panel 221 of the computing display. The lines delineating side panel 211 and side panel 221 from the center panel 227 are for illustrative purposes and do not delineate separate display screens nor define absolute dimensions of the first side panel 211 and second side panel 221. Rather, the computing display 207 includes a flexible housing 229 and a flexible display 231 disposed thereon. As used herein, a flexible display refers to or includes an output device for presentation of information in visual form, and which is capable of bending and/or folding as described herein. Non-limiting examples of a flexible display include a light emitting diode (LED), an organic light emitting diode (OLED), a liquid crystal display (LCD), a cathode ray tube display (CRT), and/or a touchscreen, among other non-limiting examples. The flexible housing 229 and the flexible display 231 may bend in a manner that allows side panel 211 to fold over center panel 227 and side panel 221 to fold over center panel 227, via hinge modules 209 and 219.

Each of hinge modules 209 and 219 may include a plurality of components that facilitate flexion of the flexible display. In some examples, the first hinge module 209 includes a plurality of hinge bars 213-1, 213-2, 213-3, and 213-4 (collectively referred to herein as hinge bars 213) extending parallel to a plane 215 of the computing display 207. The first hinge module 209 may further include a plurality of resistance bands 217-1, 217-2, and 217-3 (collectively referred to herein as resistance bands 217) coupling the plurality of hinge bars 213. The hinge bars 213 may comprise metal, plastic, or other rigid structure or materials. Similarly, the resistance bands 217 may comprise metal, plastic, or other rigid structure or materials. Each resistance band may be coupled to at least one hinge bar, as illustrated. For instance, resistance band 217-1 may be coupled to hinge bars 213-1 and 213-2, resistance band 217-2 may be coupled to hinge bars 213-2 and 213-3, and resistance band 217-3 may be coupled to hinge bars 213-3 and 213-4.

The computing display 207 also includes a second hinge module 219 disposed on a second side panel 221 of the computing display 207. Similar to the first hinge module 209, the second hinge module 219 includes a plurality of hinge bars 223-1, 223-2, 223-3, and 223-4 (collectively referred to as hinge bars 223) extending parallel to a plane 215 of the computing display 207. The second hinge module 219 includes a plurality of resistance bands 225-1, 225-2, 225-3 (collectively referred to as resistance bands 225) coupling the plurality of hinge bars 223. The plurality of resistance bands 225 may comprise the same and/or similar material as the resistance bands 217. Additionally, the plurality of hinge bars 223 may comprise the same and/or similar material as the hinge bars 213.

In various examples, the first hinge module 209 is to fold a first side panel 211 of the computing display 207 over a center panel 227 of the computing display 207 and the second hinge module 219 is to fold a second side panel 221 of the computing display 207 over the center panel 227. For instance, side panel 221 may fold in towards the center panel 227 responsive to application of a force 237 (illustrated in FIG. 2B) on second side panel 221.

Figure 2B:
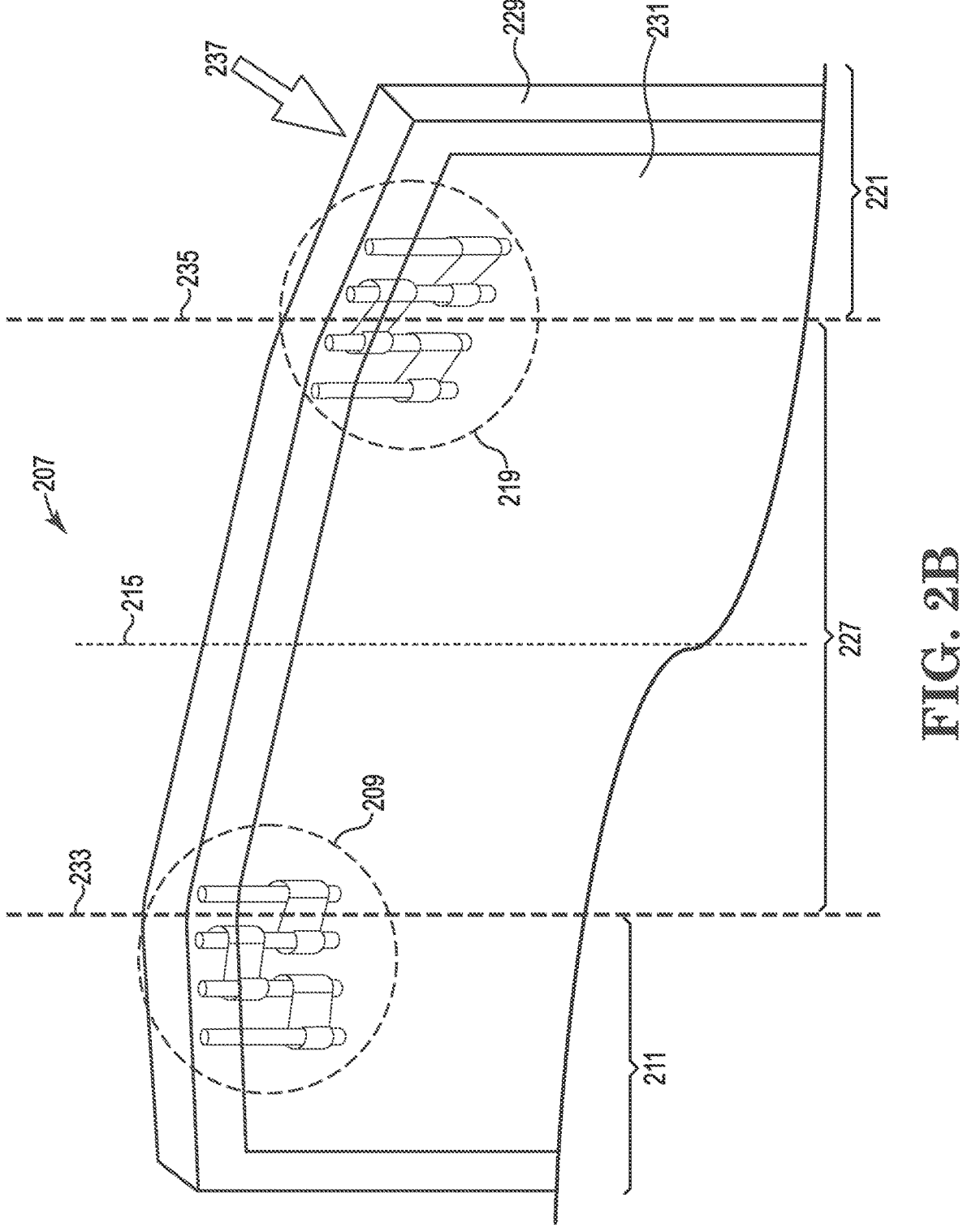
FIG. 2B illustrates an example folding computing display with hinge modules in a second position, in accordance with the present disclosure.

FIG. 2B illustrates an example folding computing display with hinge modules in a second position, in accordance with the present disclosure. As used herein, a second position refers to or includes a folding computing display that is partially closed and/or with side panels that are partially folded inward toward the center panel. As discussed with regards to FIG. 2A, the computing display 207 may include a housing 229 and a flexible display 231. In some examples, the housing 229 and the flexible display 231 are comprised of a flexible material which allows the housing 229 and the flexible display 231 to bend about axes 233 and 235 without cracking. In such a manner, each of the housing 229 and the flexible display 231 flex along an axis 233, 235, of a respective hinge module 209, 219 responsive to application of a force. For instance, each of the first hinge module 209 and the second hinge module 219 are disposed between the housing 229 and the flexible display 231. Responsive to application of a force 237 on the housing 229, the second side panel 221 of the computing display may fold inward, as illustrated. Although the individual components are not numbered for simplicity sake, hinge module 219 may facilitate flexion of the side panel 221 about axis 235. Similarly, hinge module 209 may facilitate flexion of the side panel 211 about axis 233.

In some examples, the first hinge module 209 is to enable flexion of the first side panel 211 over the center panel 227 of the computing display 207 along an axis 233 parallel to the first plurality of hinge bars 213, and the second hinge module 219 is to enable flexion of the second side panel 221 over the center panel 227 of the computing display 207 along an axis 235 parallel to the second plurality of hinge bars 223. In various examples, the second side panel 221 folds inward (e.g., over the center panel 227) responsive to application of force 237 on the back of the housing 229. Similarly, the first side panel 211 may fold inward (e.g., over the center panel 227) responsive to application of a force on the back of the housing 229.

Figure 2C:
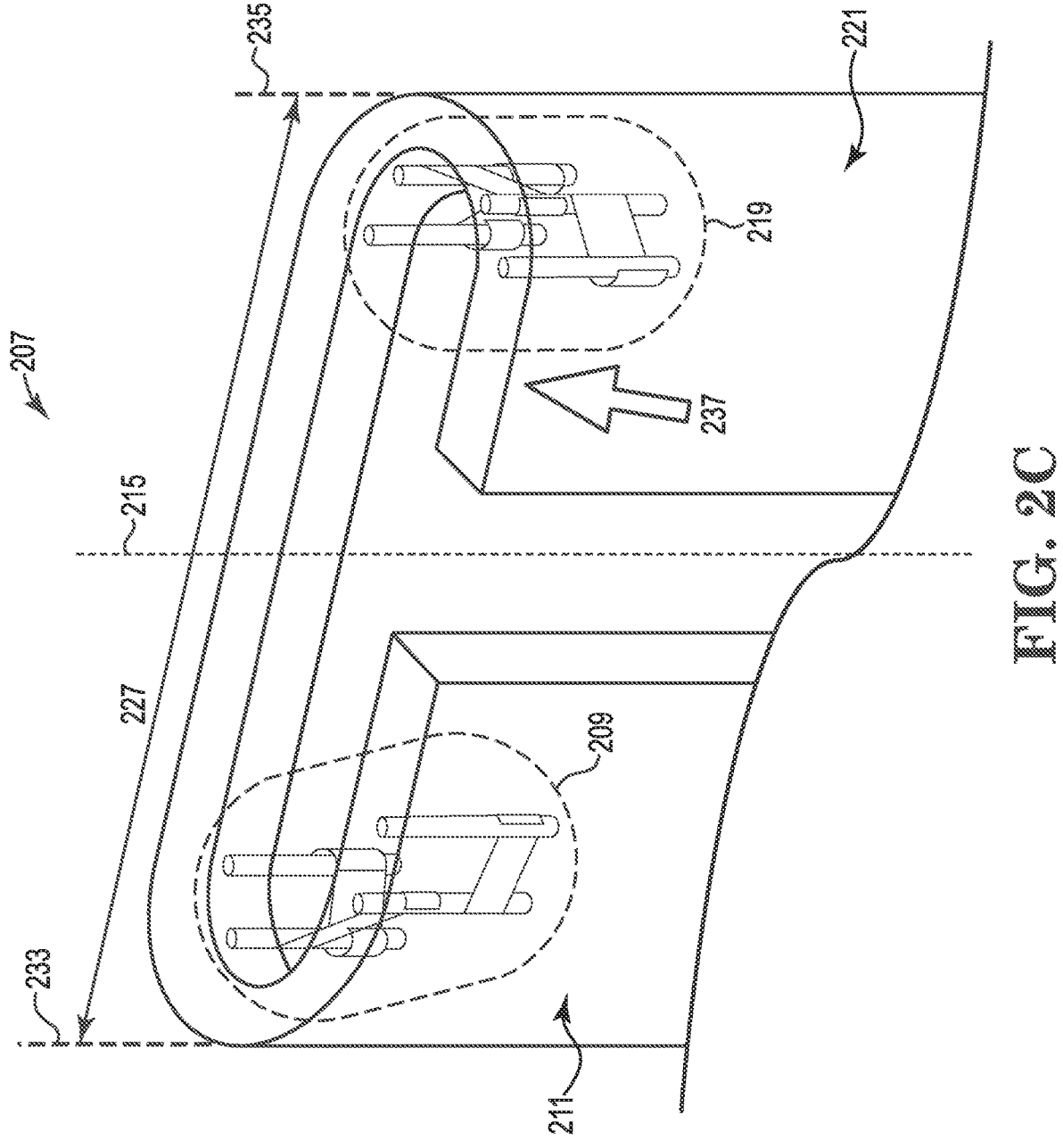
FIG. 2C illustrates an example folding computing display with hinge modules in a third position, in accordance with the present disclosure.

FIG. 2C illustrates an example folding computing display with hinge modules in a third position, in accordance with the present disclosure. As used herein, a third position refers to or includes a flexible computing display in which the side panels are folded inward toward a center panel, so as to close the flexible computing display. In some examples, the third position refers to or includes a closed position, in that the flexible computing display may close (such as with a closed clamshell) and the first side panel and second side panel may wrap around the center panel. The position illustrated in FIG. 2C demonstrates the computing display 207 in a closed position. In the closed position, the computing display 207 may fold around or wrap around, a base of a notebook computer such as a portion of a notebook computer including a keyboard and touchpad, among other things. As illustrated in FIG. 2C, the first side panel 211 may fold over the center panel 227, about axis 233, and the second side panel 221 may fold over the center panel 227 about axis 235. The first hinge module 209 may facilitate flexion of the first side panel 211 responsive to application of a force, and the second hinge module 219 may facilitate flexion of the second side panel 221 responsive to application of a force 237. For instance, the hinge bars 213 may fold over one another but remain connected via resistance bands 217. Similarly, hinge bars 223 may fold over one another but remain connected via resistance bands 225. In such a manner, hinge module 209 facilitates flexion of side panel 211 over center panel 227 and hinge module 219 facilitates flexion of side panel 221 over center panel 227. In the examples illustrated in FIGS. 2A, 2B, and 2C, side panel 211 and side panel 221 fold over the center panel 227 independent of one another, and responsive to application of a force on the respective side of the housing 229. In the examples illustrated in FIGS. 3A, 3B, and 3C, the side panels may simultaneously fold over the center panel responsive to application of a force on one of the sides.

Figure 3A:
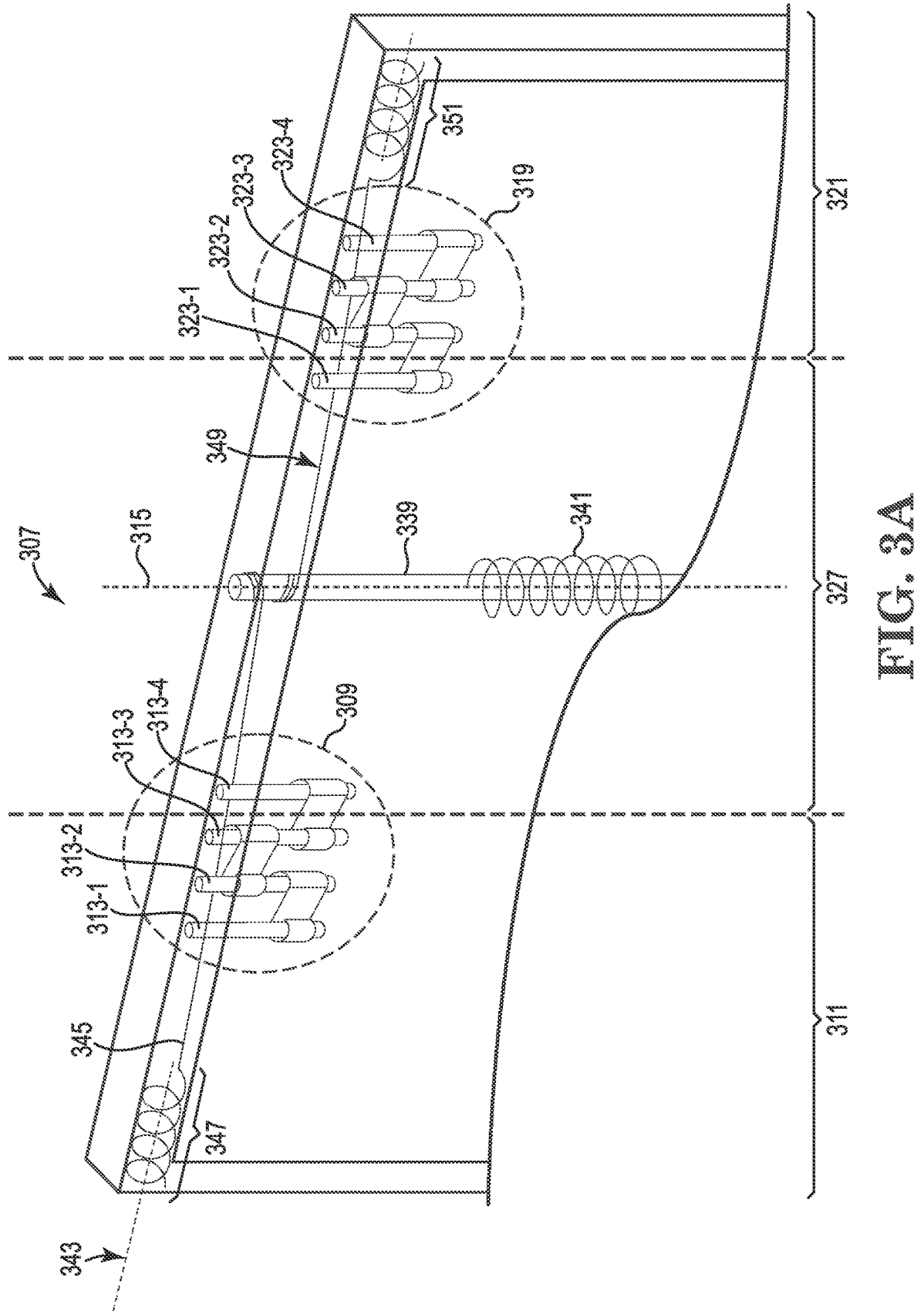
FIG. 3A illustrates an example folding computing display with simultaneous hinge modules in a first position, in accordance with the present disclosure.

FIG. 3A illustrates an example folding computing display with simultaneous hinge modules in a first position, in accordance with the present disclosure. As used herein, a simultaneous hinge module refers to or includes a hinge module that operates simultaneously, or nearly simultaneously, with another hinge module. For instance, FIG. 3A illustrates an apparatus, comprising a computing display 307 as discussed herein. The computing display 307 may be similar to computing display 207 and include similar components. Similar components are numbered similarly. For instance, hinge bars 213 are similar to hinge bars 313. Also, hinge bars 223 are similar to hinge bars 323.

Figure 3B:
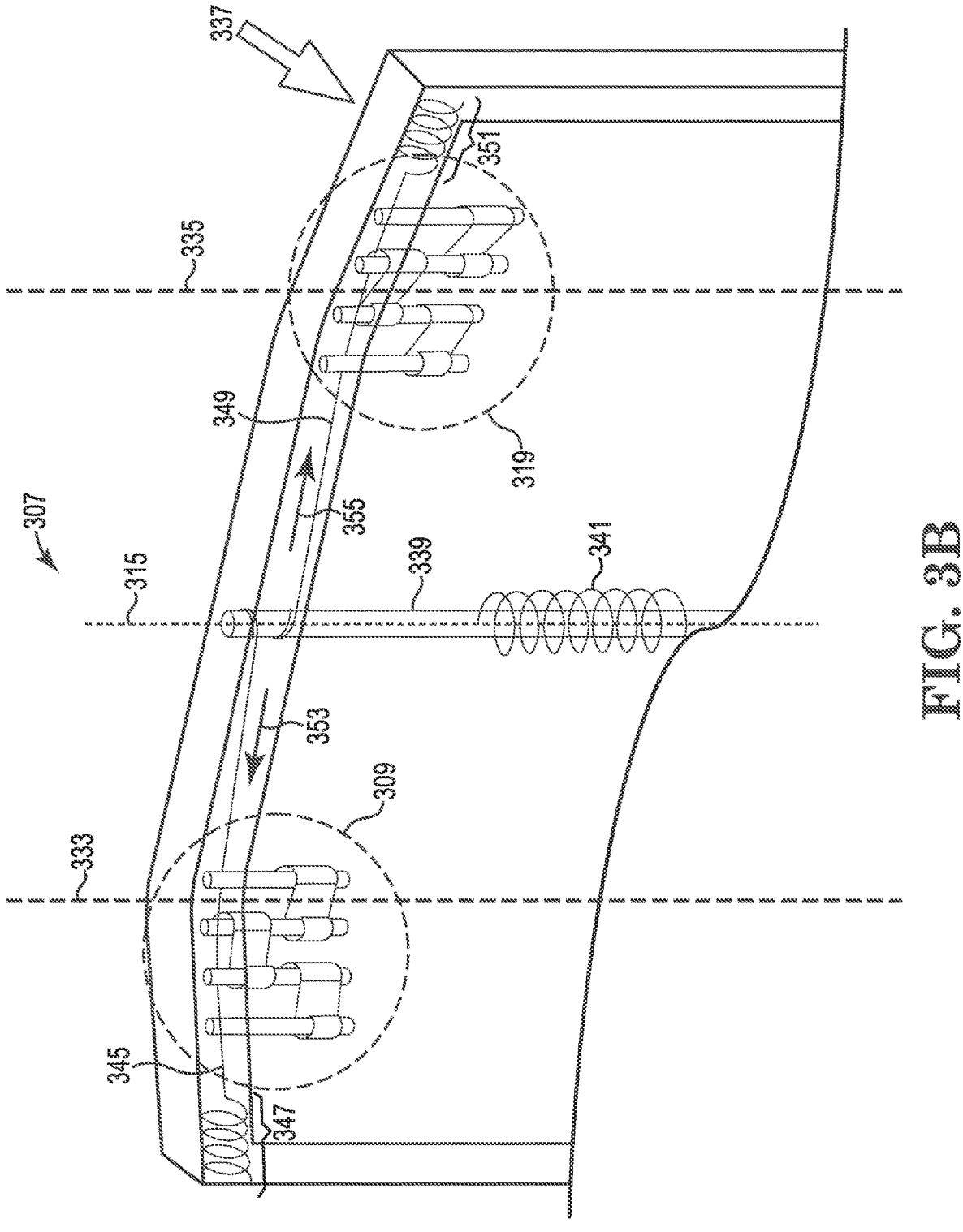
FIG. 3B illustrates an example folding computing display with simultaneous hinge modules in a second position, in accordance with the present disclosure.
Figure 3C:
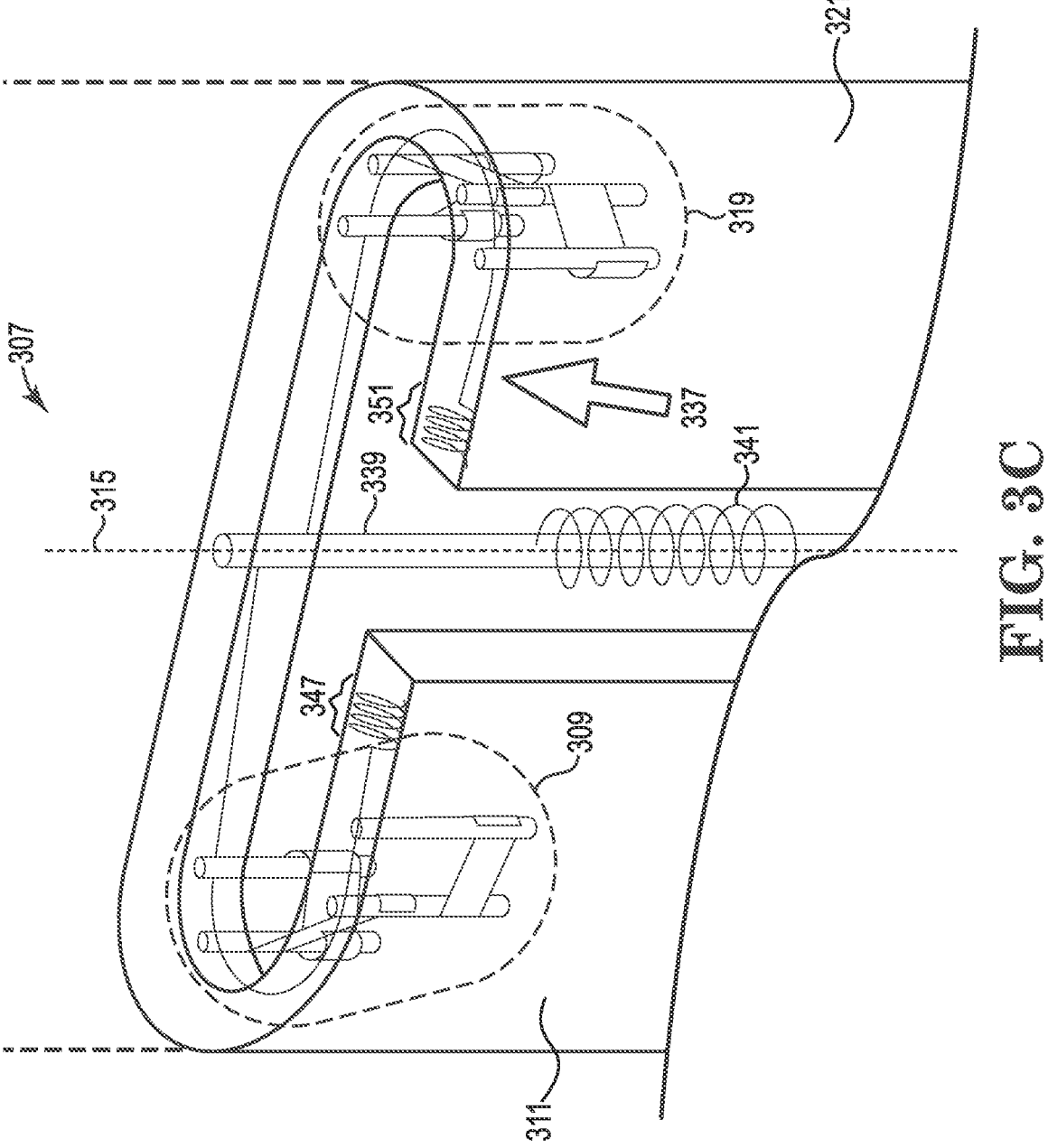
FIG. 3C illustrates an example folding computing display with simultaneous hinge modules in a third position, in accordance with the present disclosure.

In some examples, the computing display 307 includes a spring center shaft 339 extending longitudinally along a plane 315 of the computing display 307. As used herein, a spring center shaft refers to or includes a solid rod-shaped component extending along plane 315, and which maintains a particular level of tension via a spring 341. The spring center shaft 339 may be coupled to a first flexion mechanism and a second flexion mechanism. As used herein, a flexion mechanism refers to or includes a plurality of components that enable flexion of a respective side of the computing display 307. The flexion mechanism may include the hinge modules, as described with regards to FIGS. 2A, 2B, and 2C. In some examples, the first flexion mechanism is to fold a panel 321 of the computing display 307 toward the spring center shaft 339 responsive to application of a force on the panel of the computing display. The progressive steps of folding the computing display 307 are illustrated in FIGS. 3B and 3C. As described in the following description, the first flexion mechanism and the second flexion mechanism are to substantially simultaneously fold the computing display toward the spring center shaft responsive to application of a force.

FIG. 3B illustrates an example folding computing display with simultaneous hinge modules in a second position, in accordance with the present disclosure. As discussed with regards to FIG. 2A, the computing display 307 may include a housing and a flexible display. In some examples, the housing and the flexible display are comprised of a flexible material which allows the housing and the flexible display to bend about axes 333 and 335 without cracking. In such a manner, each of the housing and the flexible display flex along an axis 333, 335, of a respective hinge module 309, 319 responsive to application of a force.

In some examples, the first hinge module 309 is to enable flexion of the first side panel 311 over the center panel 327 of the computing display 307 along an axis 333 parallel to the first plurality of hinge bars 313. Similarly, the second hinge module 319 is to enable flexion of the second side panel 321 over the center panel 327 of the computing display 307 along an axis 335 parallel to the second plurality of hinge bars 323. In various examples, the second side panel 321 folds inward (e.g., over the center panel 327) responsive to application of force 337 on the back of the housing. Similarly, the first side panel 311 may fold inward (e.g., over the center panel 327) responsive to application of a force.

Each flexion mechanism may include a plurality of components that facilitate simultaneous motion of the side panels 311 and 321. For instance, a first flexion mechanism may include a first tension coil 347 extending laterally along a plane 343 of the computing display 307. The first flexion mechanism may further include a first hinge module 309 coupled to the first tension coil 347 via a wire 345. Similarly, a second flexion mechanism may include a second tension coil 351 extending laterally along a plane 343 of the computing display 307. The second flexion mechanism further includes a second hinge module 319 coupled to the second tension coil 351 via a wire 349. Responsive to application of a force 337 on the second side panel 321, tension coil 351 may compress (as illustrated), and wire 349 may begin to pull in direction 355 and unwind from the spring center shaft 339. As the spring center shaft 339 is rotated in direction 355 by wire 349, wire 345 moves in direction 353 and compresses tension coil 347. As tension coil 351 compresses, hinge module 319 bends. Similarly, as tension coil 347 compresses, hinge module 309 bends. As wire 345 moves responsive to the equal and opposite motion of wire 349, the degree to which side panel 311 folds about axis 333 responsive to application of force 337, is approximately equal to the degree to which side panel 321 folds about axis 335 responsive to application of force 337.

FIG. 3C illustrates an example folding computing display with simultaneous hinge modules in a third position, in accordance with the present disclosure. As discussed with regards to FIG. 3B, the first flexion mechanism fold a second panel 321 of the computing display 307 toward the spring center shaft 339 responsive to application of a force on the first panel 311 of the computing display 307.

As used herein, the designation of "first" and "second" are for illustrative purposes only, and are used to distinguish one object of a particular type from another object of the same type. Similarly, the designation of "right" and "left" are used to distinguish one object of a particular type from another object of the same type. Such designations are used relative to one another, and are generally used to describe components from the perspective illustrated in the figures. As these designations are relative to one another, the "first" may also be referred to in some instances as the "second" and the "right" may in some instances be referred to as the "left." In this context, FIGS. 3A, 3B, and 3C should be understood to indicate that application of a force on one side of the computing display may result in a simultaneous movement of both sides of the display. That is, if a user applies a force 337 on side 321, both side 321 and side 311 may fold inward, as described. Similarly, if a user applies a force on side 311, both side 311 and side 321 may fold inward as described. Accordingly, the first flexion mechanism may operate to fold a first panel 311 of the computing display 307 and a second panel 321 of the computing display 307 toward the spring center shaft 339 responsive to application of a force on the first panel of the computing display. In the closed position, as illustrated in FIG. 3C, tension coils 347 and 351 are in a compressed state, and wires 345 and 349 are fully extended away from spring center shaft 339. Accordingly, wires 345 and 349 are released from spring center shaft 339, in that the wires do not wrap around the spring center shaft 339 while the computing display 307 is in the closed position (as illustrated). Although the wires 345 and 349 are described as being "released" from the spring center shaft 339, both wires are fixed to the spring center shaft 339 distal to the spring 341, such that the side panels 311 and 321 may extend in the opposite direction, back towards the first position illustrated in FIG. 3A. As such, application of a force in the opposite direction of force 337 may cause lengthening of tension coil 351, movement of wire 349 in the direction of spring center shaft 339, and unfolding of hinge module 319. Responsive to movement of wire 349 toward the spring center shaft 339, a rotational force on spring center shaft 339 may cause wire 345 to simultaneously (or near simultaneously) move toward spring center shaft 339, tension coil 347 to elongate, and hinge mechanism 309 to unfold. In such a manner, application of a force opposite to force 337 may cause both side panel 321 and side panel 311 to unfold back into the first position illustrated in FIG. 3A.

Figures 4A, 4B:
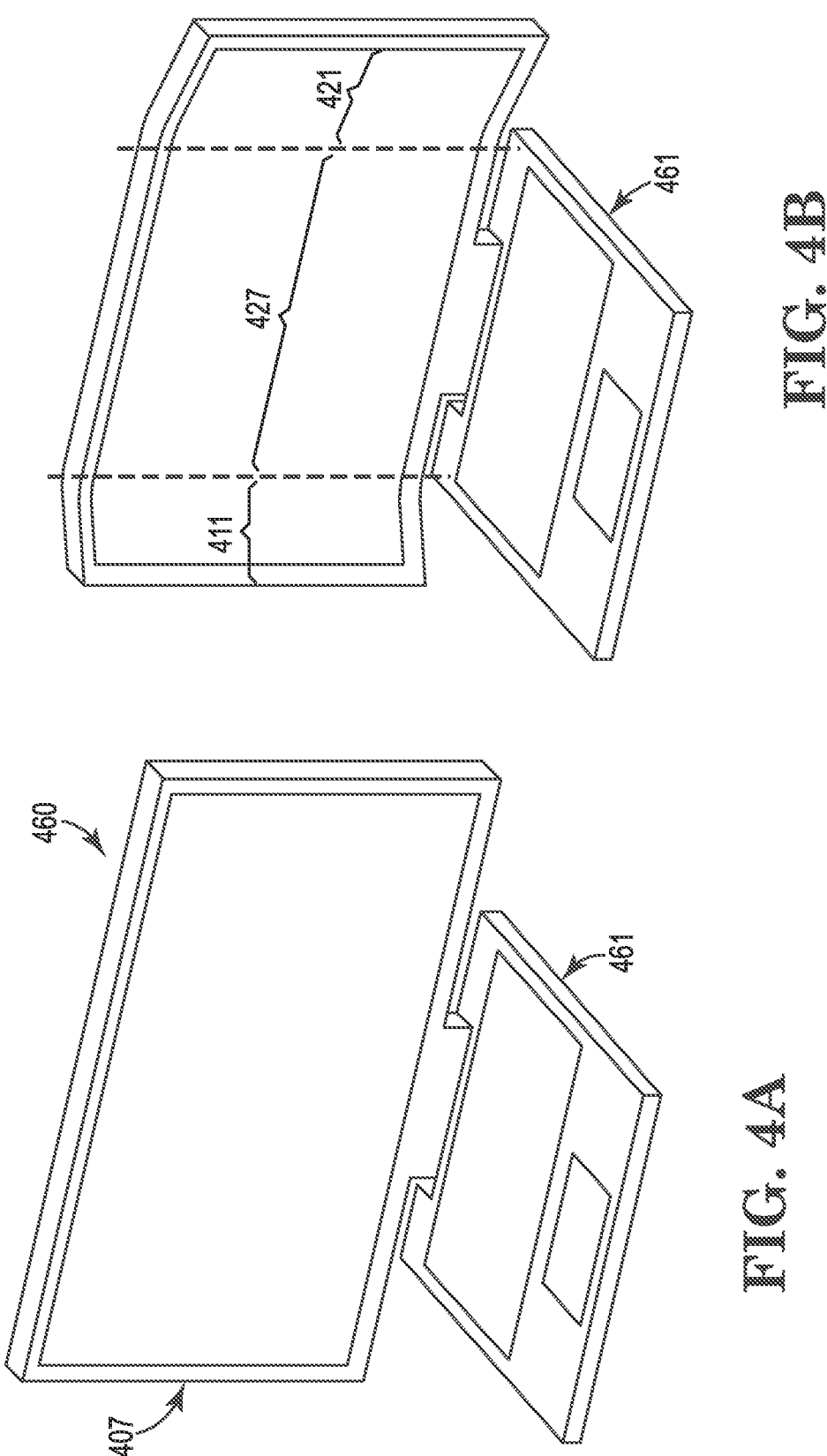
FIG. 4A illustrates an example apparatus including a folding computing display in a first position, in accordance with the present disclosure.
FIG. 4B illustrates an example apparatus including a folding computing display in a second position, in accordance with the present disclosure.
Figure 4C:
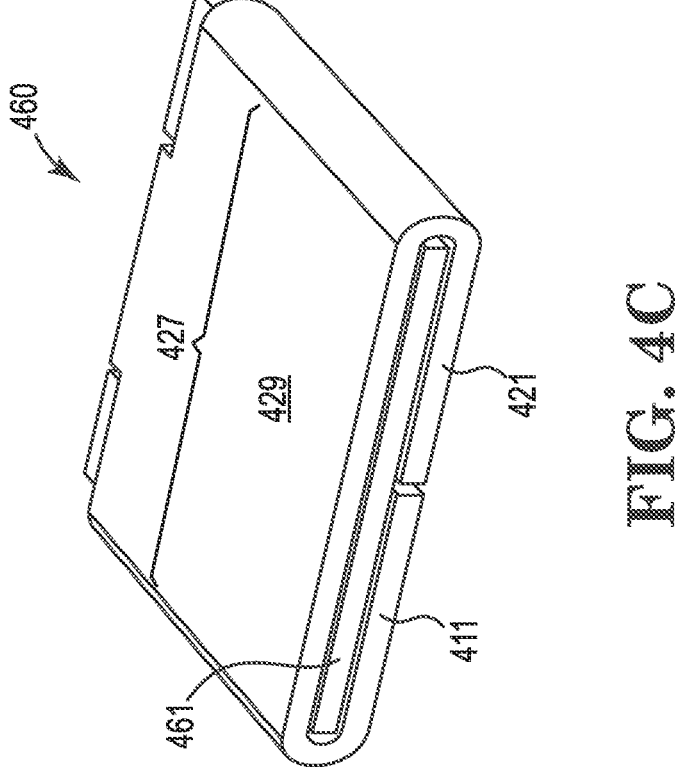
FIG. 4C illustrates an example apparatus including a folding computing display in a third position, in accordance with the present disclosure.

Although various examples describe the computing display 307 moving from a first (e.g., "open") position to a third (e.g., "closed") position, the apparatus described herein may also be used to form a curved display, as illustrated in FIGS. 4A, 4B, and 4C.

FIG. 4A illustrates an example apparatus including a folding computing display in a first position, in accordance with the present disclosure. As illustrated in FIG. 4A, the apparatus 460 may include a folding computing display 407, similar to the folding computing display 207 and folding computing display 307. As illustrated, the apparatus 460 may also include a base 461. The base 461 may include a keyboard, a touchpad, and/or other components of a notebook type of personal computer. Also as illustrated in FIG. 4A, aspects of the present disclosure permit for the computing display 307 to have a larger surface area than the surface area of the base 461. For instance, aspects of the present disclosure allow the folding computing display 407 to fold around the base 461, as illustrated in FIG. 4C. In some examples, the computing display is to lock the first hinge mechanism and the second hinge mechanism in a partially closed position during operation of the apparatus, as illustrated in FIG. 4B.

FIG. 4B illustrates an apparatus including a folding computing display in a second position, in accordance with the present disclosure. As illustrated in FIG. 4B, side panel 411 and side panel 421 may partially close inward toward center panel 427, using the hinge mechanisms described herein. In some examples, the side panels may stay and/or lock in a partially closed position, as illustrated in FIG. 4B, such that the computing display 407 is oriented in a curved position for use. In such examples, the hinge mechanisms described with regards to FIGS. 2A, 2B, 20, 3A, 3B, and 3C may fold the side panels 411 and 421 inward toward the center panel 427 responsive to application of a force, and will stop folding inwards when the application of the force stops. In some examples, the hinge mechanisms may fold the side panels 411 and 421 inward toward the center panel 427 responsive to application of a force, and will continue moving by spring force toward the closed position even in the absence of application of a force. In either example, the computing display 407 may be locked in place to retain the partially closed arrangement illustrated in FIG. 4B.

In some examples, the computing display includes a base 461 coupled to the computing display 407 by a hinge. As discussed with regards to FIG. 2, the computing display 407 may fold around the base 461 in a closed position.

FIG. 4C illustrates an example apparatus including a folding computing display in a third position, in accordance with the present disclosure. As illustrated in FIG. 4C, the computing apparatus 460 is closed, such that the housing 429 of the computing display 407 is wrapped around the base 461. In such examples, the side panels 411 and 421 are folded toward the center panel 427 of the computing display 407, and fold underneath the base 461. In such a manner, the computing display 407 may have a larger form factor than the base 461, allowing for an improved user experience with regards to enlarged visual displays, while retaining the portability of a smaller form factor computing device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:

receiving a first force on a first side panel of a computing display, wherein the computing display further comprises:

a spring center shaft extending longitudinally along a plane of the computing display and disposed along a center panel, and a first flexion mechanism along the first side panel, the first flexion mechanism including a first hinge module disposed on the first side panel, the first hinge module including a plurality of hinge bars extending parallel to the plane of the computing display and a plurality of resistance bands coupling the plurality of hinge bars;

responsive to receiving the first force on the first side panel, applying a second force on a second side panel of the computing display, wherein the computing display further comprises:

a second flexion mechanism along the second side panel, the second flexion mechanism including a second hinge module disposed on the second side panel, the second hinge module including a plurality of hinge bars extending parallel to the plane of the computing display and a plurality of resistance bands coupling the plurality of hinge bars, wherein the first hinge module is to fold the first side panel over the center panel and the second hinge module is to fold the second side panel over the center panel, and wherein the first flexion mechanism and the second flexion mechanism are coupled to the spring center shaft such that folding of the first side panel toward the spring center shaft, responsive to application of a force, causes folding of the second side panel toward the spring center shaft; and responsive to application of the first force and the second force, causing the first side panel and the second side panel to fold over the center panel of the computing display.

2. The method of claim 1, further including causing a first spring disposed along the first side panel to curtail responsive to application of the first force on the first side panel.

3. The method of claim 1, further including causing a first spring disposed along the first side panel and a second spring disposed along the second side panel to separate from the spring center shaft responsive to application of the first force on the first side panel.

4. The method of claim 1, further including causing the first hinge module to rotate responsive to application of the first force on the first side panel.

5. The method of claim 4, further including causing the second hinge module to rotate responsive to application of the first force on the first side panel.

6. An apparatus, comprising:

a computing display comprising:

a spring center shaft extending longitudinally along a plane of the computing display and disposed along a center panel, a first flexion mechanism along a first side panel of the computing display, the first flexion mechanism including a first hinge module disposed on the first side panel, the first hinge module including a plurality of hinge bars extending parallel to the plane of the computing display and a plurality of resistance bands coupling the plurality of hinge bars, and a second flexion mechanism along a second side panel of the computing display, the second flexion mechanism including a second hinge module disposed on the second side panel, the second hinge module including a plurality of hinge bars extending parallel to the plane of the computing display and a plurality of resistance bands coupling the plurality of hinge bars, wherein the first hinge module is to fold the first side panel of the computing display over the center panel and the second hinge module is to fold the second side panel of the computing display over the center panel, and wherein the first flexion mechanism and the second flexion mechanism are coupled to the spring center shaft such that folding of the first side panel toward the spring center shaft responsive to application of a force causes folding of the second side panel toward the spring center shaft; and a base coupled to the computing display by a hinge, wherein the computing display is to fold around the base in a closed position.

7. The apparatus of claim 6, wherein:

the first flexion mechanism includes:

a first tension coil extending laterally along a plane of the computing display; and a first hinge module coupled to the first tension coil; and the second flexion mechanism includes:

a second tension coil extending laterally along a plane of the computing display; and a second hinge module coupled to the second tension coil.

8. The apparatus of claim 6, wherein the first flexion mechanism is to fold a first panel of the computing display toward the spring center shaft responsive to application of a force on the first panel of the computing display.

9. The apparatus of claim 8, wherein the first flexion mechanism is to fold a second panel of the computing display toward the spring center shaft responsive to application of a force on the first panel of the computing display.

10. The apparatus of claim 6, wherein the first flexion mechanism is to fold a first panel of the computing display and a second panel of the computing display toward the spring center shaft responsive to application of a force on the first panel of the computing display.

11. The apparatus of claim 6, wherein the computing display is to lock the first flexion mechanism and the second flexion mechanism in a partially closed position during operation of the apparatus.

12. A computing display comprising:

a spring center shaft extending longitudinally and disposed along a center panel;

a first flexion mechanism along a first side panel, the first flexion mechanism including a first hinge module disposed on the first side panel, the first hinge module including a plurality of hinge bars extending parallel to a plane of the computing display and a plurality of resistance bands coupling the plurality of hinge bars; and a second flexion mechanism along a second side panel, the second flexion mechanism including a second hinge module disposed on the second side panel, the second hinge module including a plurality of hinge bars extending parallel to the plane of the computing display and a plurality of resistance bands coupling the plurality of hinge bars, wherein the first hinge module is to fold the first side panel over the center panel and the second hinge module is to fold the second side panel over the center panel, and wherein the first flexion mechanism and the second flexion mechanism are coupled to the spring center shaft such that folding of the first side panel toward the spring center shaft, responsive to application of a force, causes folding of the second side panel toward the spring center shaft.

13. The computing display of claim 12, wherein the spring center shaft comprises a rod-shaped component and a spring.

14. The apparatus of claim 6, wherein the spring center shaft comprises a rod-shaped component and a spring.

15. The computing display of claim 12, including a housing and a flexible display, wherein each of the housing and the flexible display flex along an axis of a respective hinge module responsive to application of a force.

16. The computing display of claim 15, wherein each of the first hinge module and the second hinge module are disposed between the housing and the flexible display.

17. The computing display of claim 12, wherein the first hinge module is to enable flexion of the first side panel over the center panel of the computing display along an axis parallel to the first plurality of hinge bars, and the second hinge module is to enable flexion of the second side panel over the center panel of the computing display along an axis parallel to the second plurality of hinge bars.

* * * * *